UNITED STATES PATENT OFFICE.

KARL JAGERSPACHER AND THILO KRÖBER, OF BASLE, SWITZERLAND, ASSIGNORS TO THE FIRM OF SOCIETY OF CHEMICAL INDUSTRY IN BASLE, OF BASLE, SWITZERLAND.

BLUE AZO DYE AND PROCESS OF MAKING SAME.

SPECIFICATION forming part of Letters Patent No. 759,284, dated May 10, 1904.

Application filed January 5, 1904. Serial No. 187,817. (No specimens.)

*To all whom it may concern:*

Be it known that we, KARL JAGERSPACHER, chemist and doctor of philosophy, a subject of the Emperor of Austria-Hungary, and THILO KRÖBER, chemist and doctor of philosophy, a subject of the Duke of Saxe-Altenburg, both residents of Basle, Switzerland, have invented new and useful Improvements in the Manufacture of Blue Monoazo Dyestuffs, of which the following is a clear and complete specification.

The invention relates to the manufacture of blue monoazo dyestuffs derived from peridioxynaphthalenesulfonic acids and from diazo derivatives of the monoacidyldiamidophenolether of the general formula

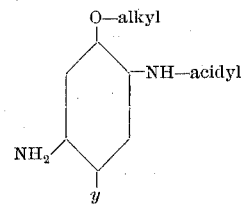

(in which $y$ may be an alkyl radical, chlorin, or other halogen, $SO_3H$, $CO.OH$, &c.,)—as, for instance, monoacidyl-2:5-diamidoparacresolethers, monoacidyl-2:5-diamidoparachlorophenolethers, &c. These dyestuffs are amidoazo dyestuffs of the general formula:

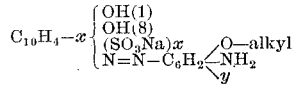

($y$ having the same significance as in the preceding formula.) For the manufacture of the dyestuffs one molecule of one of the said monoacidyldiamidophenolethers is diazotized, the resulting diazo derivative, combined with one molecule of a sulfoacid of 1.8-dioxynaphthalene in an aqueous solution containing acetic acid or sodium carbonate and the acidyl group of the acidylamidoazo dyestuff thus obtained, is finally eliminated by ebullition with saponifying agents—as, for instance, soda-lye. The amidoazo dyestuffs thus obtained constitute powders of bronze luster, which are easily soluble in water with blue coloration, which turns to red on addition of soda-lye (caustic soda) and to red violet on addition of acetic acid. On addition of a mineral acid to the aqueous solutions of the dyestuffs the free dyestuff acids are precipitated in the form of brown-red flakes. They dissolve in concentrated sulfuric acid with a red-violet coloration and dye wool in an acid-bath in pure-blue tints fast to light and to alkali.

The following example illustrates the manufacture of the new dyestuffs: 21.4 kilos of monoacetyl-2:5-diamido-4-chlorophenolmethylether are dissolved in about three hundred kilos water and thirty kilos hydrochloric acid of thirty-per-cent. strength and diazotized by means of seven kilos of sodium nitrite, care being taken to cool with ice. The diazo solution thus produced is poured into a cooled solution of thirty-two kilos of dioxynaphthalenedisulfonic acid

in about eight hundred liters water containing an excess of sodium carbonate. When the combination is complete, one hundred and fifty kilos of caustic-soda lye of thirty-per-cent. strength are added, and the mixture is boiled for about an hour to eliminate the acetyl group. The excess of alkali is then neutralized by hydrochloric acid and the dyestuff is precipitated by adding common salt. It constitutes a powder of bronze luster which dissolves in water with blue color, turning to red by an addition of soda-lye (caustic soda) and to red violet on addition of acetic acid. On addition of a mineral acid to an aqueous solution of the dyestuff the free dyestuff acid is precipitated as brown-red flakes. The solution of the dyestuff in concentrated sulfuric acid is red violet. It dyes wool in an acid-bath pure-blue tints which are remarkably fast to light and alkali. If, in this example, the acetyldiamidochlorophenolether is replaced by an acetyl-2:5-amidoparacresolether, a dyestuff having similar properties will be obtained. Instead of dioxynaphthalenedisulfonic acid

may also be used other sulfo-acids of 1:8-dioxynaphthalene—as, for instance, dioxynaphthalenemonosulfonic acid, $$OH:OH:SO_3H = 1:8:4,$$

dioxynaphthalenedisulfonic acid, $$OH:OH:SO_3H:SO_3H = 1:8:2:4,$$

or dioxynaphthalenedisulfonic acid, $$OH:OH:SO_3H:SO_3H = 1:8:4:6.$$

Analogous isomeric dyestuffs may also be obtained by combining the diazo derivative of one molecule of an ether of 2-amido-5-nitro-4-chlorophenol or of 2-amido-5-nitroparacresol with one molecule of a sulfo-acid of 1:8-dioxynaphthalene and by treating the products thus obtained with alkaline reducing agents.

What we claim is—

1. The herein-described process for producing blue monoazo dyestuffs by first diazotizing a monoacidylparadiamidophenolether of the general formula

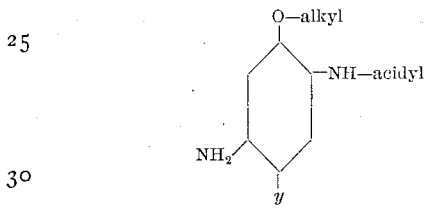

(wherein $y$ may be an alkyl radical or halogen, $SO_3H$ or COOH,) then combining one molecule of the resulting diazo compound with one molecule of a peridioxynaphthalenesulfonic acid and finally treating the thus-obtained acidylamidoazo dyestuff with a saponifying agent.

2. As a new article of manufacture the herein-described blue monoazo dyestuff corresponding to the formula

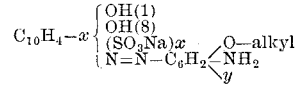

(wherein $y$ may be an alkyl radical, a halogen, $SO_3H$ or COOH) which constitutes in dry state a powder or bronze luster soluble in water with a blue coloration which turns to red on addition of soda-lye and to red violet on addition of acetic acid, soluble in concentrated sulfuric acid with a red-violet color, is precipitated from its aqueous solutions on addition of a mineral acid in form of the free dyestuff acid, as brown-red flakes and dyes wool in an acid-bath pure-blue tints fast to light and alkali.

In witness whereof we have hereunto signed our names, this 19th day of December, 1903, in the presence of two subscribing witnesses.

KARL JAGERSPACHER.
THILO KRÖBER.

Witnesses:
 AMAND RITTER,
 ALBERT GROETER.